United States Patent
Cao et al.

(10) Patent No.: US 10,518,764 B2
(45) Date of Patent: Dec. 31, 2019

(54) SYSTEM AND METHOD FOR IMPROVING FUEL ECONOMY FOR AUTONOMOUS DRIVING VEHICLES

(71) Applicant: Tula Technology, Inc., San Jose, CA (US)

(72) Inventors: Yongyan Cao, San Jose, CA (US); Ying Ren, Fremont, CA (US); Louis J. Serrano, Los Gatos, CA (US); Robert Scott Bailey, San Jose, CA (US); Ram Subramanian, Saratoga, CA (US)

(73) Assignee: Tula Technology, Inc., San Jose, CA (US)

( * ) Notice: Subject to any disclaimer, the term of this patent is extended or adjusted under 35 U.S.C. 154(b) by 40 days.

(21) Appl. No.: 15/874,656

(22) Filed: Jan. 18, 2018

(65) Prior Publication Data
US 2019/0184959 A1 Jun. 20, 2019

Related U.S. Application Data (60) Provisional application No. 62/497,312, filed on Dec. 20, 2017.

(51) Int. Cl.
*B60W 10/06* (2006.01)
*B60W 30/188* (2012.01)
(Continued)

(52) U.S. Cl.
CPC ........ *B60W 10/06* (2013.01); *B60W 30/1882* (2013.01); *B60W 30/20* (2013.01); *F02D 35/02* (2013.01); *F02D 41/0087* (2013.01); *F02D 41/1497* (2013.01); *F02D 41/1498* (2013.01); *G05D 1/0088* (2013.01);
(Continued)

(58) Field of Classification Search
CPC .. B60W 10/06; B60W 30/1882; B60W 30/20; B60W 2710/0666; F02D 35/02; F02D 41/0087; F02D 41/1498; G05D 1/0088; G06K 9/00362
See application file for complete search history.

(56) References Cited

U.S. PATENT DOCUMENTS

| 4,434,767 A | 3/1984 | Kohama et al. |
| 4,489,695 A | 12/1984 | Kohama et al. |

(Continued)

FOREIGN PATENT DOCUMENTS

| WO | WO 2010/006311 | 1/2010 |
| WO | WO 2011/085383 | 7/2011 |

OTHER PUBLICATIONS

International Search Report and Written Opinion dated Jan. 22, 2019 from International Application No. PCT/US2018/060683.

*Primary Examiner* — Tinh Dang
(74) *Attorney, Agent, or Firm* — Beyer Law Group LLP (57) ABSTRACT

The present invention relates generally to improving the fuel efficiency of autonomous vehicles by operating either (1) at a first effective engine displacement that takes into account noise, vibration and harshness (NVH) when the vehicle is occupied or (2) at a second effective engine displacement, without concern for occupant NVH, when the vehicle is not occupied. The second effective engine displacement is typically more fuel efficient than the first effective engine displacement, but result in a higher level of NVH compared to the first effective engine displacement.

41 Claims, 5 Drawing Sheets

(51) Int. Cl.
   *B60W 30/20* (2006.01)
   *F02D 35/02* (2006.01)
   *F02D 41/00* (2006.01)
   *F02D 41/14* (2006.01)
   *G05D 1/00* (2006.01)
   *G06K 9/00* (2006.01)

(52) U.S. Cl.
   CPC . *G06K 9/00362* (2013.01); *B60W 2710/0666* (2013.01); *F02D 2200/101* (2013.01); *F02D 2200/701* (2013.01); *F02D 2200/702* (2013.01)

(56) References Cited

U.S. PATENT DOCUMENTS

| | | | |
|---|---|---|---|
| 4,509,488 A | 4/1985 | Forster et al. | |
| 5,377,631 A | 1/1995 | Schechter | |
| 6,158,411 A | 12/2000 | Morikawa | |
| 6,619,258 B2 | 9/2003 | McKay et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,503,312 B2 | 3/2009 | Surnilla et al. | |
| 7,577,511 B1 | 8/2009 | Tripathi et al. | |
| 7,930,087 B2 | 4/2011 | Gibson et al. | |
| 7,979,172 B2 * | 7/2011 | Breed | G08G 1/161 |
| | | | 701/117 |
| 8,099,224 B2 | 1/2012 | Tripathi et al. | |
| 9,086,020 B2 * | 7/2015 | Pirjaberi | F02D 41/0087 |
| 9,399,964 B2 | 7/2016 | Younkins et al. | |
| 9,739,212 B1 | 8/2017 | Srinivasan et al. | |
| 9,786,181 B2 * | 10/2017 | Jo | F02D 41/403 |
| 9,868,332 B2 * | 1/2018 | Anderson | B60G 17/016 |
| 9,983,583 B2 | 5/2018 | Subramanian et al. | |
| 10,214,219 B2 * | 2/2019 | Richards | B60W 30/20 |
| 10,246,073 B2 * | 4/2019 | Miller | B60W 10/06 |
| 2008/0287253 A1 | 11/2008 | Gibson et al. | |
| 2010/0050993 A1 | 3/2010 | Zhao et al. | |
| 2015/0260117 A1 * | 9/2015 | Shost | F02D 41/0087 |
| | | | 123/481 |
| 2016/0252023 A1 | 9/2016 | Srinivasan et al. | |
| 2016/0363062 A9 | 12/2016 | Pirjaberi et al. | |
| 2017/0038775 A1 | 2/2017 | Park | |
| 2017/0122237 A1 | 5/2017 | Tripathi et al. | |
| 2017/0218867 A1 | 8/2017 | Younkins et al. | |
| 2017/0306893 A1 | 10/2017 | Leone et al. | |
| 2017/0320485 A1 | 11/2017 | Miller et al. | |
| 2017/0370301 A1 | 12/2017 | Srinivasan | |
| 2018/0164808 A1 * | 6/2018 | Prokhorov | B60W 50/08 |

* cited by examiner

FIG. 1

| Firing fraction | Engine speed (rpm) | | |
|---|---|---|---|
| | 1000 | 1100 | 1200 |
| 1/4 | 30 | 35 | 40 |
| 1/3 | 50 | 60 | 70 |
| 1/2 | 100 | 110 | 130 |
| With Occupants | | | |

| Firing fraction | Engine speed (rpm) | | |
|---|---|---|---|
| | 1000 | 1100 | 1200 |
| 1/4 | 60 | 63 | 65 |
| 2/7 | 69 | 71 | 74 |
| 1/3 | 80 | 83 | 87 |
| 3/8 | 90 | 94 | 98 |
| 2/5 | 96 | 100 | 104 |
| 3/7 | 103 | 107 | 111 |
| 4/9 | 107 | 111 | 116 |
| 1/2 | 120 | 125 | 130 |
| Without Occupants | | | |

SYSTEM AND METHOD FOR IMPROVING FUEL ECONOMY FOR AUTONOMOUS DRIVING VEHICLES

CROSS-REFERENCE TO RELATED APPLICATIONS

This application claims priority of U.S. application Ser. No. 15/849,401, filed on Dec. 20, 2017, which is incorporated herein by reference in its entirety, converted to U.S. Provisional Application No 62/497,312.

BACKGROUND

The present invention relates generally to techniques for improving vehicle fuel efficiency, and more particularly, to improving the fuel efficiency of unoccupied autonomous vehicles by operating at more aggressive effective reduced engine displacement levels, without concern for occupant noise, vibration and harshness (NVH) considerations.

Most vehicles in operation today (and many other devices) are powered by internal combustion (IC) engines. Internal combustion engines typically have a plurality of cylinders or other working chambers where combustion occurs. Under normal driving conditions, the torque generated by an internal combustion engine needs to vary over a wide range in order to meet the operational demands of the driver. The fuel efficiency of many types of internal combustion engines can be substantially improved by varying the displacement of the engine. This allows for the full torque to be available when required, yet can significantly reduce pumping losses and improve fuel efficiency through the use of a smaller displacement when full torque is not required. The most common method of varying the displacement today is deactivating a group of cylinders substantially simultaneously. In this approach, no fuel is delivered to the deactivated cylinders and their associated intake and exhaust valves are kept closed as long as the cylinders remain deactivated.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. Skip fire engine operation is distinguished from conventional variable displacement engine control in which a designated set of cylinders are deactivated substantially simultaneously and remain deactivated as long as the engine remains in the same displacement mode. Thus, the sequence of specific cylinder firings will always be exactly the same for each engine cycle during operation in any particular variable displacement mode (so long as the engine maintains the same displacement), whereas that is often not the case during skip fire operation. For example, an 8-cylinder variable displacement engine may deactivate half of the cylinders (i.e. 4 cylinders) so that it is operating using only the remaining 4 cylinders. Commercially available variable displacement engines available today typically support only two or at most three fixed displacement modes.

In general, skip fire engine operation facilitates finer control of the effective engine displacement than is possible using a conventional variable displacement approach. For example, firing every third cylinder in a 4-cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns. The Applicants, has filed a number of patents describing various approaches to skip fire control. By way of example, U.S. Pat. Nos. 7,849,835; 7,886,715; 7,954,474; 8,099,224; 8,131,445; 8,131,447; 8,464,690; 8,616,181; 8,839,766; 8,869,773; 9,086,020; 9,120,478; 9,175,613; 9,200,575; 9,291,106; 9,399,964 and others, describe a variety of engine controllers that make it practical to operate a wide variety of internal combustion engines in a skip fire operational mode. Each of these patents is incorporated herein by reference.

The Applicant has filed a number of patents describing various approaches to skip fire control. By way of example, U.S. Pat. Nos. 8,099,224; 8,464,690; 8,651,091; 8,839,766; 8,869,773; 9,020,735; 9,086,020; 9,120,478; 9,175,613; 9,200,575; 9,200,587; 9,291,106; 9,399,964, and others describe a variety of engine controllers that make it practical to operate a wide variety of internal combustion engines in a dynamic skip fire operational mode. Each of these patents is incorporated herein by reference. Many of these patents relate to dynamic skip fire control in which firing decisions regarding whether to skip or fire a particular cylinder during a particular working cycle are made in real time—often just briefly before the working cycle begins and often on an individual cylinder firing opportunity by firing opportunity basis.

In some applications referred to as dynamic multi-level skip fire, individual working cycles that are fired may be purposely operated at different cylinder outputs levels—that is, using purposefully different air charge and corresponding fueling levels. By way of example, U.S. Pat. No. 9,399,964 describes some such approaches. The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis. It should be appreciated that dynamic firing level modulation engine operation is different than conventional variable displacement in which when the engine enters a reduced displacement operational state a defined set of cylinders are operated in generally the same manner until the engine transitions to a different operational state.

Recently there have been extensive efforts to develop vehicles with the ability to drive autonomously. Although fully autonomous vehicles are not commercially available today, enormous progress has been made in their development and it is expected that self-driving vehicles will become a commercial reality in the relatively near future. When viable, autonomous vehicles will have the capability to operate without intervention by a human driver, that is, an on-board autonomous driving unit will have the ability to make decisions about acceleration, braking, stopping, steering, etc.

Since autonomous vehicles will have the ability to safely operate without human intervention, there are a number of scenarios where vehicles may operate unoccupied. For instance, a person may "summon" an unoccupied vehicle to pick them up at a designated location and drive them to another location. Or, a vehicle operating as a shuttle or taxi may autonomously drive unoccupied between the passenger drop-offs and pick-ups. In yet other examples, vehicles may operate "unmanned" in a variety of situations, such as delivery trucks, construction vehicles, farming vehicles, operation of vehicles in hazardous or dangerous areas, etc.

In an occupied vehicle, one of the constraints with any of the above-listed variable displacement methods is that, overly rough operation of the engine and/or drive train may result at certain engine displacements. As a consequence, occupants may experience an unacceptable level of noise, vibration and harshness, often referred to in the automotive industry as "NVH". Thus, with any of the above-listed variable displacement methods, the displacement level may be intentionally constrained to maintain acceptable levels of NVH, but at the expense of further fuel savings.

The Applicant has realized that with unoccupied autonomous vehicles, NVH constraints to preserve occupant comfort are no longer an issue. The present application is therefore directed to a wide variety of fuel-saving variable engine displacement strategies for unoccupied autonomous vehicles, under a host of different operating conditions, for reducing fuel consumption without NVH concerns for vehicle occupants.

SUMMARY

The present application is directed to a variety of methods, devices, controllers, and algorithms for operating an autonomous vehicle with improved fuel economy.

In one non-exclusive embodiment, a vehicle capable of autonomous operation is described. The autonomous vehicle includes an engine having a plurality of working chambers, an autonomous driving unit arranged to coordinate autonomous driving of the vehicle, including defining a requested torque demand for the engine and a controller, responsive to the autonomous driving unit, for controlling the operation of the engine to deliver the requested torque demand. In response to a torque request, the controller either (a) operates the engine at a first effective displacement when an occupant is present in the vehicle or (b) operates the engine at a second effective displacement when no occupant is present in the vehicle. In general, operating the vehicle at the second effective displacement is relatively more fuel efficient than the first engine displacement, but results in a higher level of noise, vibration and harshness (NVH). As a result, the autonomous vehicle is operated more efficiently with no occupants.

In another non-exclusive embodiment, the present application is directed to an autonomous vehicle having an engine with a plurality of working chambers arranged to selectively operate at one of a plurality of firing fractions to meet torque request demands while driving. During autonomous driving, the engine is arranged to (a) select from a first set of firing fractions, among the plurality of firing fractions, when the autonomous vehicle is occupied or (b) select from a second set of firing fractions, among the plurality of firing fractions, when the autonomous vehicle is unoccupied. When the vehicle is not occupied, a higher level of noise, vibration and harshness (NVH) can typically be tolerated. As a result, the second set of firing fraction are selected to be more fuel efficient, but provide a higher level of NVH relative to the first set of firing fractions.

With the aforementioned embodiments, an autonomous driving unit is arranged to control driving of the vehicle in response to one or more inputs from sensors that sense the driving environment, the autonomous driving unit generating varying requested torque demands in response to changes in the driving environment. An engine controller, responsive to the varying engine torque demands received from the autonomous driving unit, is provided to select from either the first or second effective displacements and/or sets of firing fractions, depending on if the vehicle is occupied or not occupied, respectively.

In yet other embodiments, the first and the second set of firing fractions are maintained in first and second look up tables respectfully. In variations of this embodiment, various firing fractions in each table may be provided based on different combinations of (a) engine speeds (RPMs) and torque request demands or (b) engine speeds (RPMs), torque request demands, and transmission gears.

In yet other embodiments, one or more additional fuel saving measures may be optionally implemented when occupants are not present in the vehicle while autonomously driving. These additional measures may include, but are not limited to (a) changing firing fractions of the working chambers of the engine, each selected among the second one or more firing fractions, while the vehicle is operating in first gear or some other low gear of vehicle's transmission, (b) changing firing fractions of the working chambers of the engine, each selected among the second one or more firing fractions, while the vehicle is shifting gears of the vehicle transmission, (c) eliminating or minimizing mechanical slippage between the engine and transmission of the vehicle, (d) implementing regenerative braking without regard to NVH concerns for occupants and/or (e) operating a suspension system of the vehicle having a plurality of modes in a most fuel-efficient mode among the plurality of modes. This list is merely illustrative and should not be construed as limiting. Other fuel saving measures may also be implemented.

In yet other embodiments, a method of operating an autonomous vehicle having an internal combustion engine that provides motive power is described. The internal combustion engine has a working chamber and the working chamber has a torque output level. When the vehicle is operated, a determination is made of whether or not an occupant is in the vehicle. Depending on the determination, the working torque output level of the engine is different when the vehicle is occupied compared to when the vehicle is not occupied.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Skip fire engine controllers often have a defined set of firing patterns or firing fractions that can be used during skip fire operation of the engine. Each firing pattern/fraction has a corresponding effective engine displacement. Often the set of firing patterns/fractions that are supported is relatively limited—for example a particular engine may be limited to using firing fractions of ⅓, ½, ⅔ and 1. Other skip fire controllers facilitate the use of significantly more unique firing patterns or fractions. By way of example, some skip fire controllers designed by Applicant facilitate operation at any firing fraction between zero (0) and one (1) having an integer denominator of nine (9) or less. Such a controller has a set of 29 potential firing fractions, specifically: 0, 1/9, 1/8, 1/7, 1/6, 1/5, 2/9, 1/4, 2/7, 1/3, 3/8, 2/5, 3/7, 4/9, 1/2, 5/9, 4/7, 3/5, 5/8, 2/3, 5/7, 3/4, 7/9, 4/5, 5/6, 6/7, 7/8, 8/9 and 1. Although 29 potential firing fractions may be possible, not all firing fractions are suitable for use in all circumstances. Rather, at any given time, there may be a much more limited set of firing fractions that are capable of delivering the desired engine torque while satisfying manufacturer imposed drivability and noise, vibration and harshness (NVH) constraints. An engine's firing pattern or firing fraction may also be expressed as an effective operational displacement, which indicates the average displacement of the engine used to generate torque by combustion of fuel under the current operating conditions.

Typically, an engine controller will determine the desired/requested engine torque based on the driver demand (e.g. accelerator pedal position) plus the load applied by any ancillary devices (e.g., air conditioner, alternator/generator, etc.). In the case of a self-driving car, the driving torque request may be made by an autonomous driving unit (ADU). During operation, the skip fire controller will determine the appropriate firing fraction/pattern for delivering the requested torque, often taking into account other relevant engine or vehicle operating parameters such as engine speed, gear, vehicle speed, etc. In some circumstances, environmental factors such as road roughness or ambient noise levels may also be utilized in the determination of the desired firing fraction/pattern. State of the art firing fraction selection generally contemplates selecting the fuel optimal firing fraction that can deliver the requested torque and meets the designated NVH and drivability requirements.

In most circumstances, for any given engine output, firing fractions/patterns having a lower firing densities are more fuel efficient than higher firing density patterns/fraction. Thus, one common approach is to select the lowest firing fraction that can deliver the requested engine torque while meeting any imposed drivability requirements and/or other design requirements.

With unoccupied autonomous vehicles, NVH constraints to preserve occupant comfort are no longer an issue. The present application is therefore directed to a wide variety of fuel-saving variable engine displacement strategies for unoccupied autonomous vehicles, under a host of different operating conditions, for reducing fuel consumption without NVH concerns for vehicle occupants.

It should be understood, however, that while occupant NVH considerations may not be an issue with unoccupied autonomous vehicles, there still may be a need, in certain situations, to set NVH limits. For instance, a maximum allowable NVH level may be set to prevent long term damage to the vehicle or to meet certain minimal drive-by noise requirements. In other words, operating an unoccupied autonomous vehicle without any NVH constraints whatsoever may result in damage to the vehicle itself, unacceptable vehicle wear, and/or may generate an unacceptable amount of ambient noise. Consequently, setting a maximum allowable NVH level is generally a good practice to preserve the long-term operational integrity of the vehicle, avoid costly repairs, and for operating the vehicle within acceptable noise levels.

Figure 1:
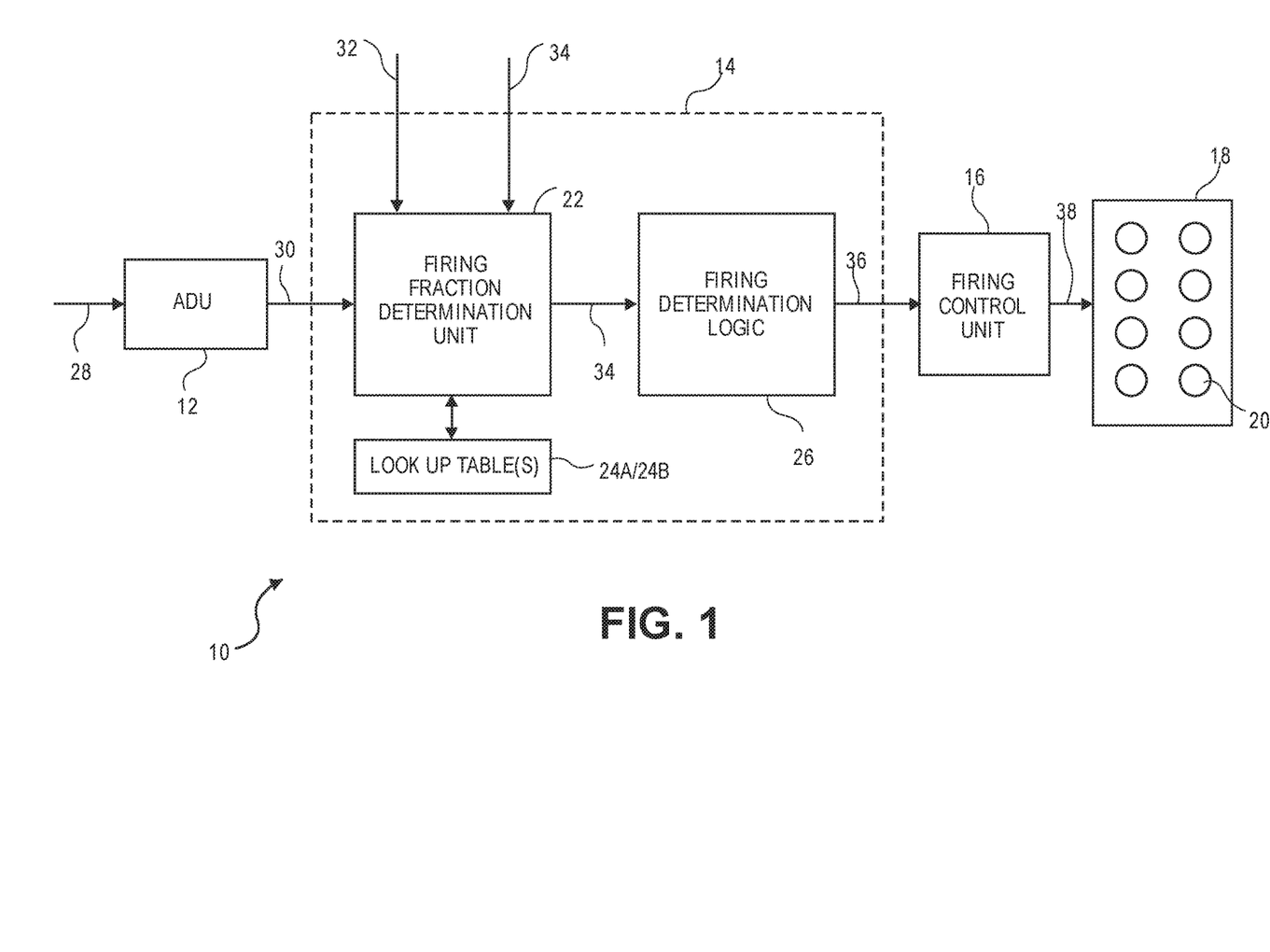
FIG. 1 is a block diagram of the control logic of an exemplary autonomous driving vehicle in accordance with a non-exclusive embodiment of the present invention.

Referring to FIG. 1, a block diagram of the control logic 10 of an exemplary autonomous driving vehicle is illustrated. The control logic 10 includes an autonomous driving unit (ADU) 12, a firing fraction controller 14, a firing control unit 16, and an engine 18 including a plurality of working chambers or cylinders 20. The firing fraction controller 14 also includes a firing fraction determination unit 22, one or more look up tables 24 maintained in a memory unit (not illustrated) accessible by the unit 22, and firing determination logic 26.

In this particular embodiment, the ADU 12 effectively replaces a driver in that it receives inputs 28 from sensors (not illustrated) or other sources that sense real world information concerning the surrounding driving environment. Such inputs may include information obtained from on-board radar, Lidar and/or camera systems, a cruise control system, an automated braking system, by communicating with other vehicles, from a global position system (GPS), from traffic signals, etc, or any combination thereof. In response to the inputs 28, the ADU 12 determines the varying driving torque request signal 30, typically using proprietary algorithms, based on perceived driving conditions. As driving conditions change, meaning as the vehicle accelerates, de-accelerates, brakes, turns, etc., the ADU 12 processes all relevant input and provides the updated torque request signal 30 to the firing fraction determination unit 22. The torque request signal 30 represents the requested torque demand on the engine 18.

In some embodiments, the ADU 12 is capable of fully controlling operation of the vehicle in a self-driving mode, regardless if the vehicle is occupied with passengers or not. A vehicle may autonomously drive without occupants in a number of scenarios. For instance, an unoccupied vehicle may autonomously drive when summoned (i.e., driving to pick up occupants at a specified location), when operating as a taxi or shuttle between passenger drop-offs and pick-ups, or as an unmanned vehicle, such as an autonomous delivery vehicle, a GPS equipped farming vehicle, etc. It should be understood that these scenarios are just a few of the possible instances where a vehicle may operate unoccupied. These examples should not be construed as limiting and the present invention may be used in any situation where an autonomous vehicle is driving while unoccupied.

Alternatively, the autonomous vehicle may also operate with occupants. In this latter scenario, the level of engagement of any occupant of the driver's seat may vary. In some situations, the occupant may take a passive role and not drive the vehicle whatsoever, meaning the vehicle is fully autonomous (e.g., controls steering, braking acceleration, de-acceleration, etc.). Alternatively, the driver may take some active role in driving. The driver, for instance, may steer the vehicle, while other on-board systems control the acceleration and/or braking of the vehicle.

In certain non-exclusive embodiments, an advanced cruise control device can serve as an ADU, since it governs the driving torque request. Thus, the ADU 12 should widely construed to include any device or vehicle mode that determines torque requests while driving.

The firing fraction determination unit 22 receives, in addition to the torque request signal 30, an occupancy status signal 32 and optionally an override input signal 34. The occupancy status signal 32 is generated by one or more sensors (not illustrated), typically located in the cabin of the vehicle. Depending on if the vehicle is occupied by one or more passengers, the signal 32 is either set or reset. As a result, the firing fraction determination unit 22 is informed if passengers are present or not in the vehicle while driving. The optional override signal 34 may be used in embodiments where it may be desirable to override any firing fraction calculations made by the unit 22 based on the vehicle being unoccupied. For instance, if the vehicle is a delivery truck carrying fragile cargo, it may not make sense to operate the engine 18 at a particular firing fraction that may be fuel efficient, but creates a relatively high level of NVH. On the contrary with the override input signal 34 set, unit 22 may select a firing fraction that reduces NVH, typically at the expense of fuel efficiency.

In response to the input 30 from ADU 12, the occupancy status signal 32 and possibly the override input signal 34, the unit 22 determines an appropriate firing fraction 34 to meet the instantaneous torque demand. In one non-exclusive embodiment, unit 22 relies on one or more look up 24a or 24b to determine the appropriate firing fraction 34. For instance, memory accessible by the unit 22 may include one table defining one set of firing fractions for when the vehicle is occupied and a second table defining a second set of firing fractions for when the vehicle is unoccupied. The look up table used when the vehicle is occupied, or if the override input signal 34 is set, will provide a set of firing fractions to deliver a requested torque demand that in general offer relatively improved NVH performance, but at the expense of fuel economy. On the other hand, the look up table that is used with no occupant(s) generally will define a set of firing fractions to deliver a requested torque demand that are relatively more fuel efficient, but at the expense of relatively more NVH.

The look-up tables 24 may be two-dimensional and define different firing fractions based on various combinations of engine speeds (RPMs) and torque demands. Alternatively, the tables 24 may be three-dimensional and define different firing fractions based on various combinations of engine speeds, torque requests, and different transmission gears. Other dimensions, such as drive line slip, may be added to the tables 24 as well. Regardless of the type of table used, the unit 22 is responsible for selecting a firing fraction from the tables 24 depending on factors such as (a) is the vehicle occupied or not based on the status of signal 32, (b) engine speed, (c) torque request signal 30 and (d) possibly override signal 34. Also, other ancillary factors, such as air conditioning loads as discussed above, may be factored in as well. Additionally, drive line slip, for example, torque converter slip, may be included in the determination of appropriate power train parameters, since increasing the drive line slip will reduce delivered brake torque. The selected firing frequency defines an effective displacement of engine 18 to meet the required torque demand.

The firing fraction determination unit 22 provides the appropriate firing fraction 34, selected from the one or more tables 24, to the firing determination logic 26. In response, logic 26 is arranged to issue a sequence of firing commands 36 that cause the engine 18 to deliver the percentage of firings dictated by the defined firing fraction 34. The sequence of firing commands (sometimes referred to as a drive pulse signal) 36 outputted by the firing timing determining logic 26 are passed to the firing control unit 16, which orchestrates via signals 38 the actual firings of the working chambers 20 as dictated by the drive pulse signal 36.

The firing timing determining logic 26 is arranged to issue drive pulse signal 36 that causes the engine 18 to deliver the percentage of firings dictated by unit 22. The firing timing determining logic 26 may take a wide variety of different forms. By way of example, sigma delta converters work well as firing timing determining logic 26. A number of the Applicant's patents and patent applications describe various suitable firing timing determining modules, including a wide variety of different sigma delta based converters that work well as the firing timing determining module. See, e.g., U.S. Pat. Nos. 7,886,715, 8,099,224, 8,131,445, 8,839,766, 9,020,735 and 9,200,587. A significant advantage of using a sigma delta converter or an analogous structure is that it inherently includes an accumulator or memory function that tracks the portion of a firing that has been requested, but not yet delivered. Such an arrangement helps smooth transitions by accounting for the effects of previous fire/no fire decisions.

It should also be understood that a firing pattern or fraction may also be expressed in terms of an effective operational displacement of the engine 18. For a given torque request for example, the firing fraction determination unit 22 may select a first firing fraction (i.e., a first engine displacement) if the vehicle is occupied, or a second firing fraction (i.e., a second engine displacement) if the vehicle is unoccupied. Again, as a general rule for a given torque request, those effective displacements selected while the vehicle is unoccupied generally provide better fuel economy, but increased levels of NVH, relative to those effective displacements selected when the vehicle is occupied. In some embodiments, the firing fraction determination unit 22 may be eliminated. In this case the torque request 30 may be directly input into the firing determination logic 26. The vehicle occupant signal 32 and override signal 34 may to connected to the firing determination logic 26 as well and may function in a manner similar to that previously described. The firing determination logic 26 may also use a sigma-delta converter to determine the drive pulse pattern 36. The sigma-delta converter converts the requested torque demand to an effective displacement or firing fraction. Such a control method can maximize fuel economy but may also create substantially more NVH Referring to FIGS. 2 and 3, several exemplary look up tables 24a and 24b for determining engine torque values are illustrated. With these examples, the two tables each provide allowed torque values (in Newton-meters) for various combinations of engine speeds (RPMs) and firing fractions.

Figure 2:
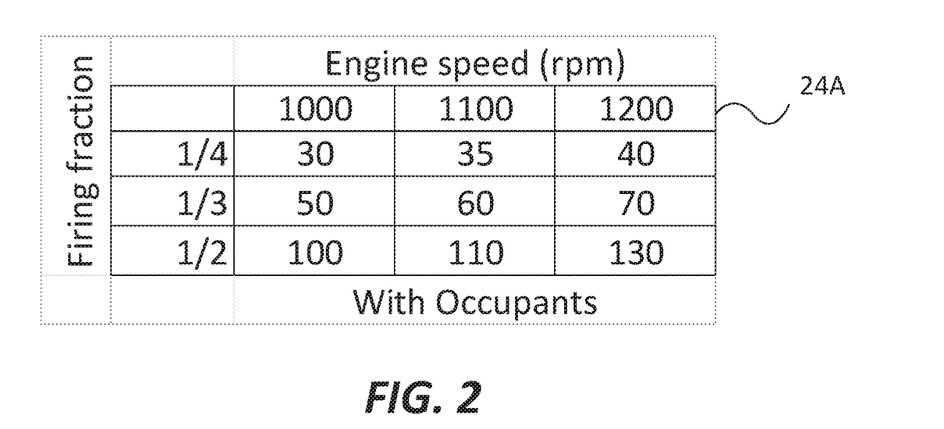
FIGS. 2 and 3 are exemplary look up tables for determining firing fractions as used in the present invention.
Figure 3:
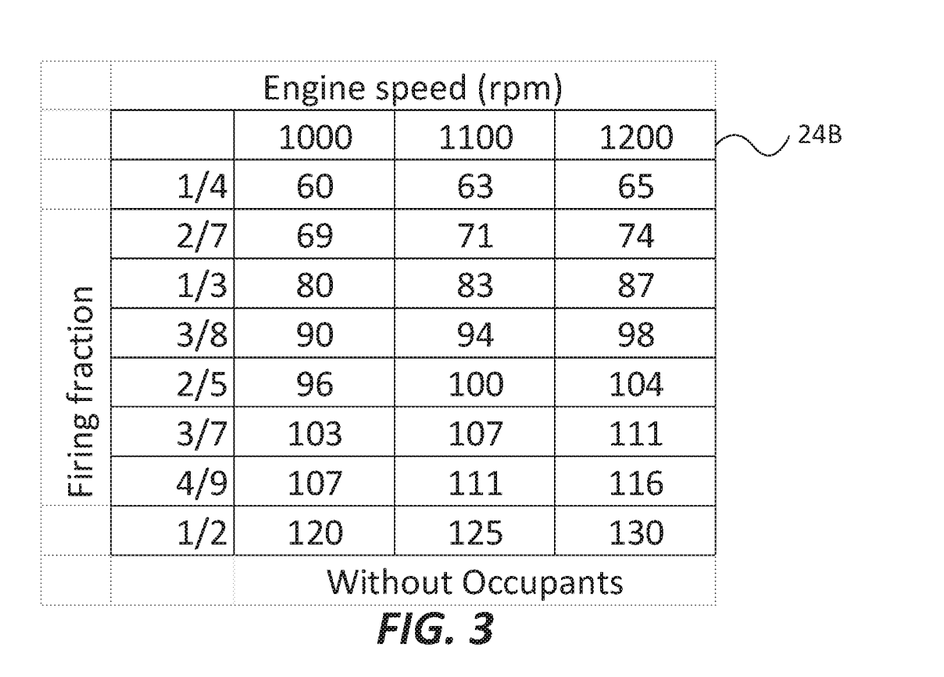

Table 24a in FIG. 2 is used when occupants are in the vehicle, whereas table 24b in FIG. 3 is used when the vehicle is unoccupied.

The torque values in table 24a represent either (a) the maximum torque that can be generated at the specified engine speed and firing fraction without producing unacceptably high NVH levels or (b) the torque value associated with operating the fired working chambers at maximum fuel efficiency.

The torque valves in table 24b generally represent case (b), where the torque value results from operating the fired working chambers at maximum fuel efficiency. There may, however; be some firing fractions where the NVH level at the optimum working chamber load may be so severe that the working chamber load given in table 24b may be less than the optimal working chamber load. The torque values in table 24b are equal to or higher than those of table 24a and generally represent the most fuel-efficient torque that can be produced at the specified engine speed and firing fraction.

With access to tables 24a and 24b, the firing fraction determination unit 22 can switch between the tables depending on the vehicle occupancy status. For example, consider a requested torque of 83 N*m at an engine speed of 1100 rpm. With the vehicle occupied, table 24a would be used to determine the firing fraction. In this case, the only firing fraction in table 24a capable of delivering the torque at that engine speed is a firing fraction of ½. Since the maximum torque at this engine speed is 110 N*m, engine parameters, such as throttle, valve timing, spark retard, etc. would be adjusted so that the engine output would match the torque request of 83 N*m. These adjustments will cause the fired working chambers to produce torque less efficiently, i.e. at a higher brake specific fuel consumption (BSFC). On the other hand if the vehicle is unoccupied, table 24b would be used. In this case the requested torque of 83 N*m can be provided by operating the engine at a firing fraction of ⅓. Generally operating with the lower firing fraction for the same torque request will improve fuel economy. The ability to operate the engine in a manner unconstrained, or less constrained, by NVH considerations will allow operation on firing fractions that are more fuel efficient when the vehicle is unoccupied for a given torque request in many situations. For cases where the requested torque at a certain engine speed exceeds the values listed in table 24b, the working chamber load can be increased above its most fuel efficient operating point until a maximum working chamber load is reached. The firing determination logic 26 may determine whether it is more fuel efficient to operate the engine at a firing fraction that can deliver the requested torque at a lower firing fraction with a working chamber load greater than optimal or at a higher firing fraction operating at a working chamber load less that optimal. In table 24a at least some of the entries have working chamber load constrained by NVH, not working chamber load efficiency considerations. In the example shown, the only value not constrained by NVH is at a firing fraction of ½ and engine speed of 1200 rpm. For both tables 24a and 24b maximum torque is obtained at a firing fraction of one, all working chamber operation.

The two tables provided in FIGS. 2 and 3 are exemplary and are intended to show how the firing fraction determination unit 22 may select different firing fractions, each appropriate to meet a requested torque demand, depending on if the vehicle is occupied or not. The tables may be constructed differently with the table entries being the firing fraction and the indices being requested torque demand and engine speed. It should be understood that tables 24a and 24b are merely illustrative and that typically more detailed tables are used that specify a maximum torque across the entire operating range of engine speed and firing fraction values. Also, depending on the transmission gear different tables may be used. Generally, the unoccupied vehicle table 24b will have many more allowable firing fraction entries than the occupied vehicle table 24a, since the set of firing fractions that deliver acceptable NVH is more limited when the vehicle is occupied.

When making skip fire based fuel economy decision, it is important that the torque request being considered be the total torque request as opposed to simply the drive torque request (which is the torque intended for the drivetrain). The total torque request includes any accessories torque loads (e.g. the load(s) applied by an air conditioning unit, an alternator, etc.). In hybrid vehicles of any type (including full-hybrids, mild-hybrids, mini-hybrids, micro-hybrids etc.), it would also include any torque load (or torque addition) imparted by any motor/generator(s), etc. A potential advantage of the architecture of FIG. 1 is that the control logic 10 has knowledge of the torque demands of the accessories and can therefore readily include the influence of such loads in the firing fraction and fuel consumption determinations.

Figure 4:
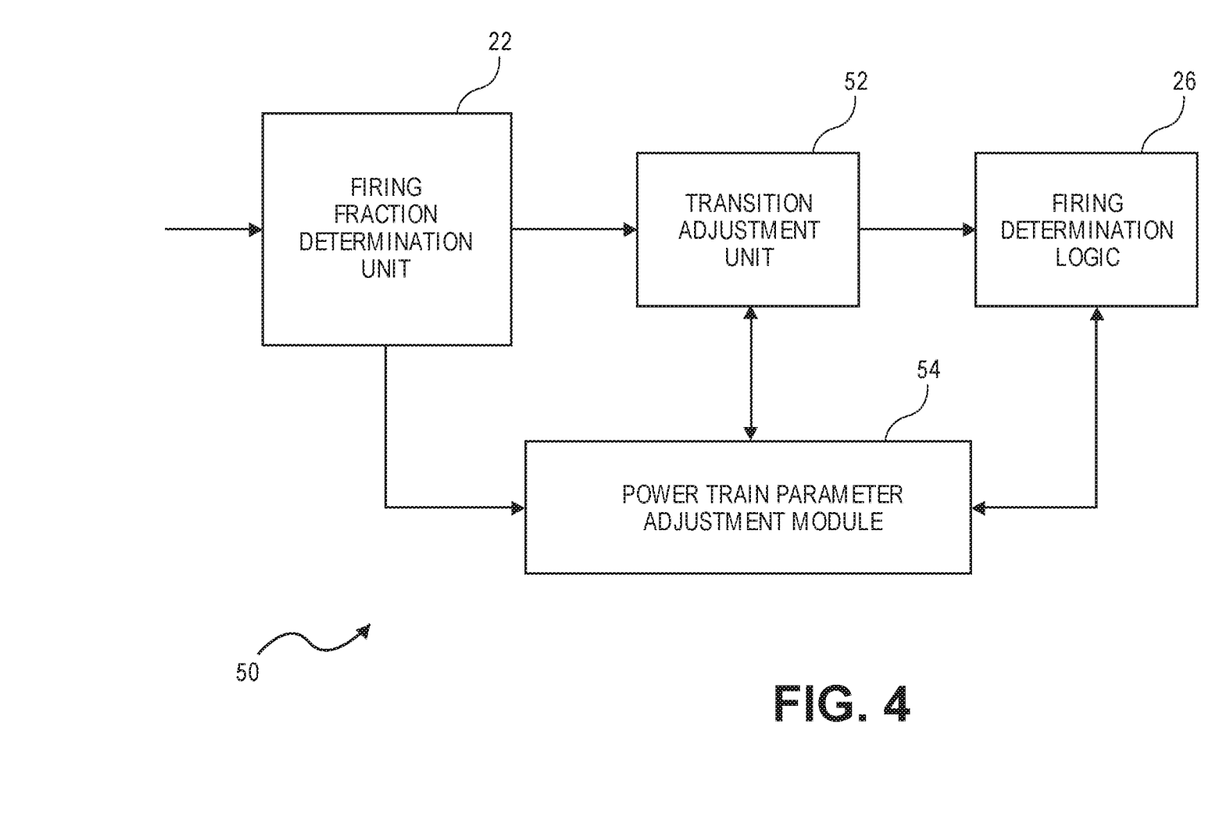
FIG. 4 is a block diagram of other control logic of another exemplary autonomous driving vehicle in accordance with another non-exclusive embodiment of the present invention.

Referring to FIG. 4, a block diagram of control logic 50 for another exemplary autonomous driving vehicle is illustrated. This embodiment is similar to FIG. 1, but in addition, includes a transition adjustment unit 52 and a power train parameter adjustment module 54.

When a change in firing fraction is commanded by unit 22, it will often be desirable to simultaneously command a change in the cylinder mass air charge (MAC). Changes in the air charge tend to be realized more slowly than changes in the firing fraction due to the latencies inherent in filling or emptying the intake manifold and/or adjusting the valve timing of the engine 18.

Transition adjustment unit 52 is arranged to adjust the commanded firing fraction and certain engine or power train settings (e.g., intake and exhaust valve timing, throttle plate position, intake manifold pressure, torque converter slip) in a manner that helps mitigate NVH. Intake and exhaust valve timing may be adjusted by varying the camshaft phase. By adjusting the commanded firing fraction as well as various operational parameters such as spark timing, cam phase and manifold pressure during transitions, unintended torque surges or dips can be mitigated. That is, the transition adjustment unit 52 manages one or more other actuators that impact the working chamber load during transitions between commanded firing fractions. It may also control other power train parameters, such as torque converter slip and spark timing.

In unoccupied vehicles, the NVH associated with firing fraction transitions is less of a concern. Thus, the techniques described above to reduce NVH associated with firing fraction transitions can be modified or eliminated. For example, in occupied vehicles the firing transition is typically spread over a number of firing opportunities to match changes in the working chamber air charge with changes in the firing fraction. This is not a requirement in an unoccupied vehicle, so abrupt changes in firing fraction may be made. The firing working chambers may all be operated under conditions that substantially maximize fuel efficiency during the transition. For example, each firing may operate at a brake specific fuel consumption (BSFC) torque within 20% of the minimum BSFC. To achieve minimum BSFC, spark timing may be set to maximize or substantially maximize brake torque.

Depending on the nature of the engine, the working chamber air charge can be controlled in a number of ways. Most commonly, the air charge is controlled by controlling the intake manifold pressure and/or the cam phase (when the engine has a cam phaser or other mechanism for controlling valve timing). However, when available, other mechanism such as adjustable valve lifters, air pressure boosting devices like turbochargers or superchargers, air dilution devices such as exhaust gas recirculation or other mechanisms can also be used to help adjust the air charge.

Figure 5:
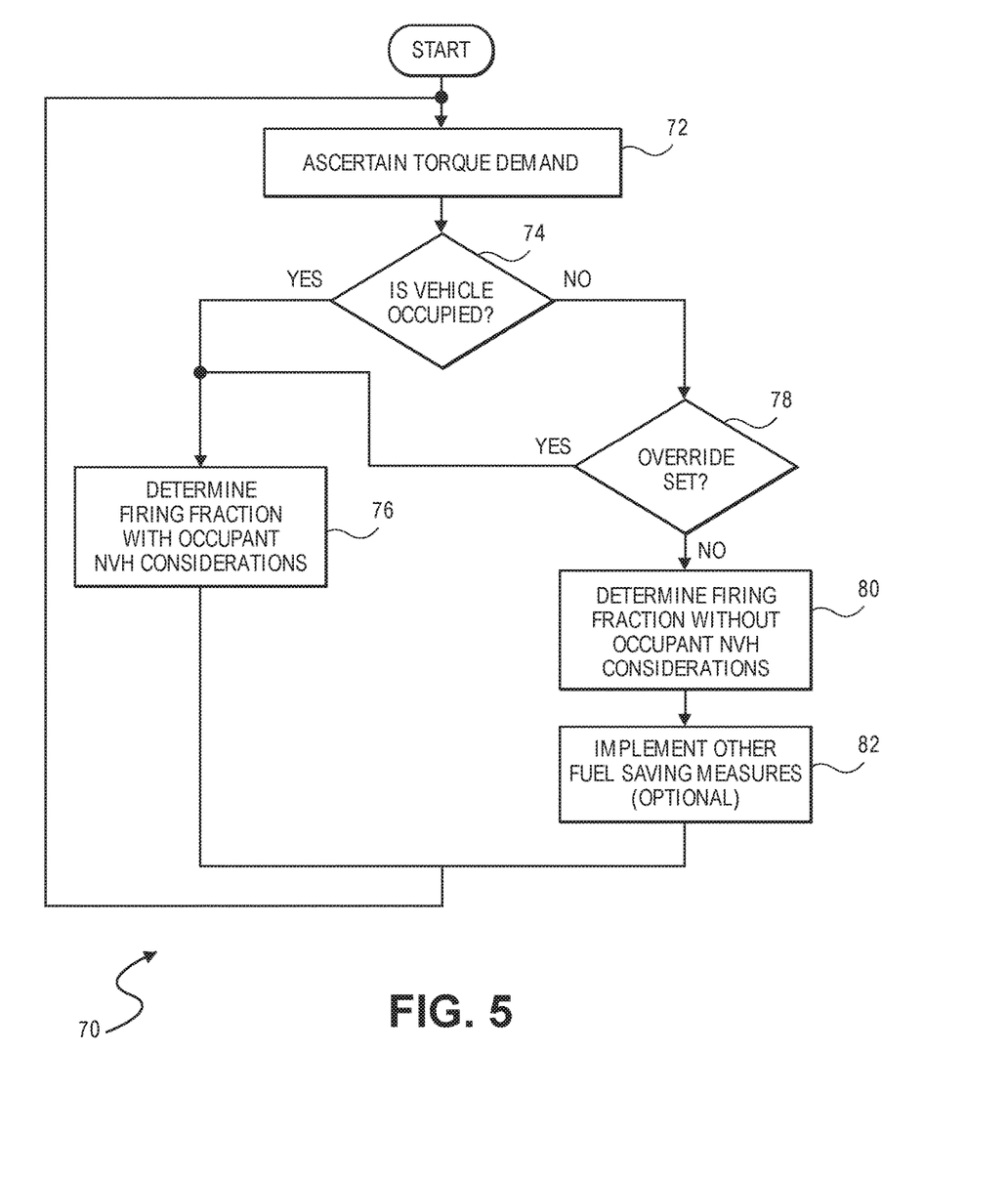
FIG. 5 is a flow chart illustrating a representative method of determining a torque request utilizing skip fire based fuel efficiency considerations.

Referring to FIG. 5, a flow chart 70 illustrating the operational steps in accordance with a non-exclusive embodiment of the invention is shown.

In the initial step 72, the ADU 12 ascertains the requested torque demand 30, which is provided to the firing fraction determination unit 22.

In decision step 74, the firing fraction determination unit 22 determines if the vehicle is occupied or not occupied based on the status of signal 32.

If the vehicle is occupied, then in step 76, the unit 22 accesses table 24a and selects the appropriate firing fraction to meet the instantaneous torque demand while taking into account occupant NVH considerations. Once the firing fraction is defined, the firing determination logic 26 and firing control unit 16 operate the working chambers 20 of the engine 18 at the corresponding effective displacement.

On the other hand if the vehicle is unoccupied, then in decision step 78, the firing fraction determination unit 22 determines if the override input signal 34 has been set or not.

If set, meaning a decision has been made to operate the vehicle with occupant considerations, then step 76 is performed as described above.

If reset, then in step 80 unit 22 accesses table 24b to select a firing fraction that meets the current torque demand, but without taking into account occupant NVH considerations. As a result, the selected firing fraction is typically more fuel efficient, but results in a higher level of NVH, relative to the firing fraction selected in step 76. Thereafter, the firing determination logic 26 and firing control unit 16 operate the working chambers 20 of the engine 18 at the corresponding effective displacement, which is typically more fuel efficient than the effective displacement resulting from the implementation of step 76.

In optional step 82, one or more fuel saving measures may also be implemented while operating at the firing fraction displacement without occupant NVH considerations. With these measures, as described in detail below, certain additional steps may be taken during autonomous operation, while occupant NVH considerations are not taken into account, to further improve fuel economy.

Figure 6:
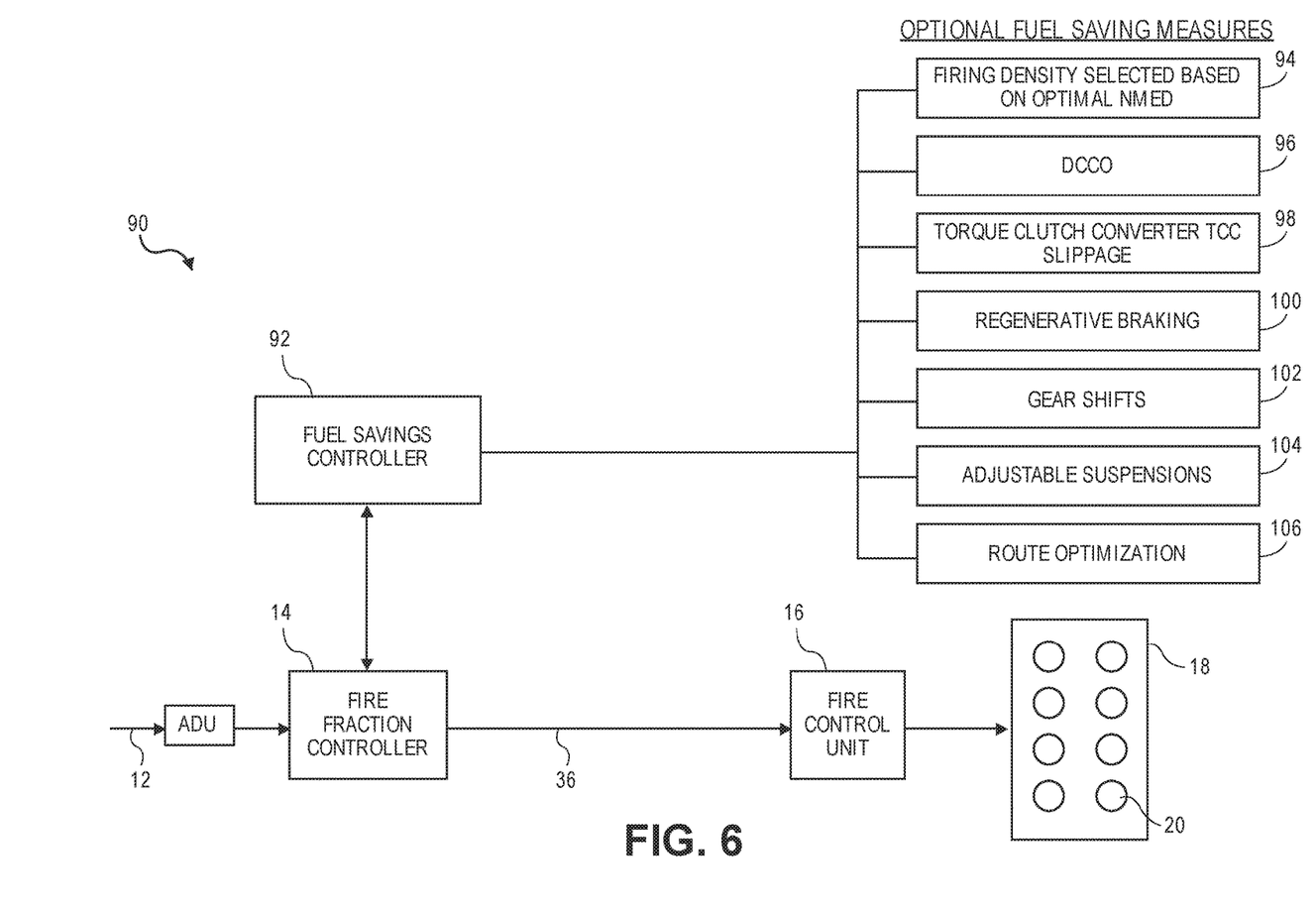
FIG. 6 is a logic block diagram for implementing a number of optional fuel saving measures in accordance with non-exclusive embodiments of the present invention.

Referring to FIG. 6, a logic block diagram 90 illustrating other optional fuel saving measures is illustrated. The diagram 90 includes an additional fuel savings controller 92 that is arranged to coordinate, in cooperation with the firing fraction controller 14, other systems on the vehicle to implement one or more other fuel saving measures. Such measures include, but are not limited to, (a) operating the vehicle in a Decel Cylinder Cut Off (DCCO) mode when no torque is requested 96, (b) controlling Torque Clutch Converter (TCC) slippage to improve fuel economy 98, (c) controlling regenerative braking to improve energy storage 100, (d) controlling gear shifting 102 to maximize fuel savings, (e) operating the vehicle in a most fuel efficient suspension mode 104 when not occupied and (f) route optimization 106 for fuel savings with no occupants. Each of these measures is explained in detail below.

Decel Cylinder Cut Off Mode Exit

Another known fuel saving measure is operating the working chambers 20 of the engine 18 in a Decel Cylinder Cut Off (DCCO) mode in situations when no torque demand is made (e.g., the vehicle is coasting downhill or to a stop). In the DCCO mode, fuel is not delivered to the working chambers and the intake and exhaust valves are controlled such that no air is pumped through the chambers into the exhaust system. As a result, fuel saving is realized. A drawback of operating in the DCCO mode, however, is that the lack of pumping causes the intake manifold absolute pressure (MAP) to drift upward toward barometric pressure. When a subsequent torque request is made and the cylinders are reengaged, the increased MAP can cause the cylinders to generate more torque than desired, which can result in undesirable NVH. As a result, a number of strategies are known to reduce the MAP prior to exiting the DCCO mode, such as intentionally pumping air through one or more cylinders to reduce the MAP before torque generation. Spark timing adjustment can also be used to mitigate the NVH effect of not pumping down the MAP. These strategies are undesirable because they either waste fuel and/or are not entirely effective. If the vehicle is unoccupied, NVH is not an issue. Consequently, the vehicle can reengage cylinders exiting the DCCO mode, without taking intermediate mitigating steps to reduce the MAP. For more details see U.S. application Ser. No. 15/009,533, incorporated by reference herein for all purposes.

Torque Clutch Converter (TCC) Slippage

It is known to adjust the amount of slippage between an engine and transmission in a vehicle to provide acceptable NVH characteristics. Often a torque converter is situated between the engine and transmission of a vehicle and the amount of slippage can be controlled with a torque converter clutch (TCC). When the slippage is reduced, there is a more direct coupling between the engine and transmission, resulting in improved fuel economy, but at the expense of increased levels of NVH. With slippage, the opposite occurs, meaning NVH is reduced, but at the expense of fuel efficiency. Again, with no occupants in an autonomous vehicle, NVH caused by a reduced amount of TCC slippage is not a concern. As a result, the vehicle can be operated at minimal or no TCC slippage, improving fuel economy. For more details see U.S. application Ser. No. 14/704,630, incorporated by reference herein for all purposes. Dual clutch transmissions (DCT), which can be used in place of a torque converter, can also have some slip. DCT slip can also be reduced or eliminated when a vehicle is unoccupied.

Regenerative Braking

Many hybrid vehicles now take advantage of regenerative or "regen" braking. When the vehicle is decelerating regen braking may occur, allowing some of the vehicle's kinetic energy to be stored in the on-board batteries of the vehicle. In addition to regen braking, most vehicles have friction brakes that dissipate the vehicle's kinetic energy as heat. Modern braking control systems work so that regen braking is used for light to moderate braking and a combination of regen and friction braking is used in heavy braking. Braking is applied so that NVH levels remain acceptable. If passengers are not present in an autonomous vehicle though, then there is no need to adjust the regen braking for passenger comfort. Thus, the braking profile can be optimized to use the friction brakes as little as possible and control the level of regen braking to provide maximum conversion efficiency of kinetic energy into stored energy.

Gear Shifts

When a vehicle is unoccupied, drive quality is no longer a concern when deciding to shift the gears of the transmission. Accordingly, when there are no occupants, gear shifts can be optimized to increase fuel efficiency. In particular, gear shift schedules may be different between an occupied and unoccupied vehicle. Gear shift schedules with no vehicle occupants can be "busier", that is there will be more gear shifts over a drive cycle. In addition, changes in the firing fraction can occur during gear shifts. As previously described fuel efficiency in firing fraction transition may be improved at the expense of increased NVH. Gear shifts can also be coordinated with dynamic changes in the firing fraction for fast torque reduction, regardless if the vehicle is occupied or not. Spark timing may remain constant or substantially constant thru the gear shift, since rapid torque adjustments thru the gear shift can be made by adjusting the firing fraction. The spark timing may be at or close to the timing that maximizes brake torque to maintain high fuel efficiency.

Adjustable Suspensions

Many vehicles have a driver tunable suspension, including modes such as sport, touring, off road, and economy. When no occupants are present, an autonomous vehicle can automatically be operated in the most fuel-efficient mode.

Route Optimization

For autonomous vehicles without occupants, route calculations between starting and destination points may be optimized based on fuel efficiency, not driver or passenger preferences. For example, route calculations may be based on the fuel efficiency considerations involving (a) driving time to the desired second location, (b) traffic enroute to the desired second location, (c) scenery or pleasantness enroute to the desired second location, (d) point(s) of interest enroute to the desired second location, (e) road quality enroute to the desired second location and/or preferences for freeways or surface streets enroute to the desired second location.

Although only a few embodiments of the invention have been described in detail, it should be appreciated that the invention may be implemented in many other forms without departing from the spirit or scope of the invention. The invention has primarily been described in the context of Applicant's dynamic skip fire operation of an engine in which firing decisions are dynamically made on a firing opportunity by firing opportunity basis using an accumulator or other mechanism that tracks the portion of a firing that has been requested, but not delivered, or that has been delivered, but not requested. However, the described techniques are equally applicable to managing transitions between any different skip fire firing fractions or between a skip fire firing fraction and all cylinder operation. While the invention has generally been described as controlling an engine to maximize operation at a fuel efficient firing density, other factors also contribute to overall vehicle efficiency. In particular, drive line slip and transmission gear (or speed ratio for a continuously variable transmission) can be managed in conjunction with firing density to operate a vehicle in a manner that provides acceptable NVH performance while maximizing fuel efficiency.

Additionally, it should also be appreciated that the same principles can be applied to most any system that improves fuel consumption by varying the displacement of an engine. This can include standard variable displacement operation of an engine where decisions are made to transition between displacement states having different numbers of cylinders (e.g., transitions between 4- and 8-cylinder operation or between 3, 4 and 6-cylinder operation). It may be used in transitions in and out of skip fire operation from/to all cylinder operation, a fixed displacement or DCCO. One such example would be transitions from all cylinder operation of a 3-cylinder engine to a rolling cylinder deactivation mode with every other cylinder being fired. It can also include multi-level engine operation where different cylinders are fired at different, dynamically determined output levels, as described, for example, in U.S. Pat. No. 9,399,964 which is incorporated herein by reference or in any other dynamic firing level modulation control architecture. For example, an architecture where three different firing levels are possible, i.e. skip, low torque load, high torque load. The effective engine displacement in such an engine is determined by the fraction of firing working chambers and the relative output of the firing working chambers. Similar techniques may also be used to manage effective displacement transitions in variable stroke engine control in which the number of strokes in each working cycle are altered to effectively vary the displacement of an engine.

In dynamic skip fire and various other dynamic firing level modulation engine control techniques, an accumulator or other mechanism may be used to track the portion of a firing that has been requested, but not delivered, or that has been delivered, but not requested. However, the described techniques are equally applicable to engines controlled using other types of skip fire or firing level modulation techniques including various rolling cylinder deactivation techniques. Therefore, the present embodiments should be considered illustrative and not restrictive and the invention is not to be limited to the details given herein, but may be modified within the scope and equivalents of the appended claims.

What is claimed is:

1. A vehicle capable of autonomous operation, comprising:
   an engine having a plurality of working chambers;
   an autonomous driving unit arranged to coordinate autonomous driving of the vehicle, including defining a requested torque demand for the engine; and
   a controller, responsive to the autonomous driving unit, for controlling the operation of the engine to deliver the requested torque demand by either:
   operating the engine at a first firing fraction that defines a first effective displacement of the engine when an occupant is present in the vehicle; or
   operating the engine at a second firing fraction that defines a second effective displacement of the engine when an occupant is not present in the vehicle,
   wherein the second effective displacement is more fuel efficient than the first engine displacement,
   wherein the controller is further arranged to operate the engine at the first effective displacement by operating the working chambers of the engine at the first effective firing fraction and operate the engine at the second effective displacement by operating the working chambers of the engine at the second effective firing fraction.

2. The vehicle of claim 1, wherein the second effective displacement has a higher level of noise, vibration and harshness (NVH) compared to the first effective displacement.

3. The vehicle of claim 1 wherein the controller is further arranged to operate the plurality of working chambers of the engine under dynamic firing level modulation control.

4. The vehicle of claim 1, wherein the controller is further arranged to operate the working chambers of the engine such that some firing opportunities are skipped, some firing opportunities produce a low torque output, and some firing opportunities produce a high torque output.

5. The vehicle of claim 1, wherein the controller is further configured to:
   operate the engine in a skip fire manner; and
   when no occupant is present in the vehicle, define the second effective firing fraction for operating the working chambers of the engine to meet the requested torque demand without occupant NVH considerations.

6. The vehicle of claim 5, wherein the controller is further configured to operate the fired working chambers, in accordance with the defined second effective firing fraction, with a working chamber load optimized for fuel efficiency.

7. The vehicle of claim 1, wherein the controller is further configured to:
operate the engine in a skip fire manner; and
when an occupant is present in the vehicle, define the first effective firing fraction for operating the working chambers of the engine to meet the requested torque demand while providing an acceptable NVH level to the occupant.

8. The vehicle of claim 1, wherein the controller includes a firing fraction determination unit capable of accessing:
a first look up table for selecting the first effective displacement; and
a second look up table for selecting the second effective displacement.

9. The vehicle of claim 1, further comprising a look up table that is accessible by the controller, the look up table defining a plurality of engine torque values for various combinations of:
(a) engine speeds, and
(b) firing fractions.

10. The vehicle of claim 1, further comprising a look up table that is accessible by the controller, the look up table defining a plurality engine torque values for various combinations of:
(a) engine speeds;
(b) firing fractions; and
(c) different transmission gears.

11. The vehicle of claim 1, wherein the controller is further configured to:
(a) when the requested torque demand is zero, operate the engine in a cylinder cut off mode where fuel is not delivered to the working chambers and no air is pumped through the chambers of the engine; and
(b) when the requested torque demand transitions to non-zero, transition operation of the engine from the cylinder cut off mode to a torque generation mode without taking mitigating action to reduce intake manifold absolute pressure if no occupant is present in the vehicle.

12. The vehicle of claim 1, wherein the controller is further configured to control a degree of reduction or elimination of mechanical slippage between the engine and a transmission of the vehicle at least partially depending on if an occupant is present in the vehicle or not.

13. The vehicle of claim 1, wherein the engine controller, in cooperation with a transmission on the vehicle, coordinate more gear shifting during driving of the vehicle when the vehicle is not occupied relative to when the vehicle is occupied.

14. The vehicle of claim 1, further comprising:
a regenerative braking system arranged to store energy while the vehicle is braking; and
an electric motor/generator arranged to cooperate with the engine to deliver the requested torque demand, the electric motor/generator using the stored energy from the regenerative braking system;
wherein the engine controller and the regenerative braking system cooperate to increase the amount of stored energy from regenerative braking when the vehicle is not occupied relative to when the vehicle is occupied.

15. The vehicle of claim 1, further comprising:
a suspension system having a plurality of operational modes; and
a suspension controller responsible for selecting one operational mode, among the plurality of operational modes, during driving of the vehicle,
wherein the controller and the suspension control system cooperate to select the most fuel efficient operational mode, among the plurality of operational modes, when the vehicle is not occupied.

16. The vehicle of claim 1, further comprising a route calculation unit configured to map a route from a first location to a second location, the route calculation unit arranged to map a most fuel-efficient route to the second location when the vehicle is not occupied without one or more constraints imposed by an occupant, the constraints selected from the group consisting of:
(a) driving time to the second location;
(b) traffic enroute to the second location;
(c) scenery enroute to the second location;
(d) point(s) of interest enroute to the second location;
(e) road quality enroute to the second location; and
(f) preferences for freeways or surface streets enroute to the second location.

17. The vehicle of claim 1, further including a configurable input that enables over-riding of the operation of the engine in the second effective displacement when no occupant is present in the vehicle.

18. The vehicle of claim 1, wherein the controller is further configured to, when no occupant is present, to transition between multiple second effective displacement levels during autonomous driving of the vehicle to meet changing requested torque demands without occupant NVH considerations.

19. An autonomous vehicle having an internal combustion engine with a plurality of working chambers arranged to meet a torque request demand while autonomously driving, the engine further arrange to:
meet the torque request demand by selecting a first operational firing fraction from a first set of firing fractions when the autonomous vehicle is occupied; and
meet the torque request demand by selecting a second operational firing fraction, when the autonomous vehicle is unoccupied,
wherein the second operation firing fraction is smaller than the first operation firing fraction.

20. The autonomous vehicle of claim 19, wherein the second operation firing fraction results in a higher level of noise, vibration and harshness (NVH) compared to the first operational firing fraction.

21. The autonomous vehicle of claim 19, wherein at least partially due to the second operational firing fraction being smaller than the first operational firing fraction, the autonomous vehicle operates in a more fuel-efficient manner when operating unoccupied compared to when the vehicle is occupied.

22. The autonomous vehicle of claim 19, further comprising a second set of firing fractions, wherein the second operational firing fraction is selected from the second set of firing fractions.

23. The autonomous vehicle of claim 19, further configured to implement one or more fuel-saving measures when occupants are not present and the engine is operating at the second operational firing fraction, the one or more fuel-saving measures comprising:
(a) eliminate or minimize slippage of a torque clutch converter mechanically coupling the engine and transmission of the vehicle;

(b) implement regenerative braking without regard to NVH concerns for occupants; and
(c) operate a suspension system of the vehicle having a plurality of modes in a most fuel-efficient mode among the plurality of modes.

24. An autonomous vehicle, comprising;
an autonomous driving unit arrange to control driving of the vehicle in response to one or more inputs from sensors that sense the driving environment, the autonomous driving unit generating varying requested torque demands in response to changes in the driving environment; and
an engine controller, responsive to the varying engine torque demands received from the autonomous driving unit, the engine controller configured to:
selectively operate a plurality of working chambers of the engine at varying first operational firing fractions selected to meet the varying engine torque demands when the vehicle is occupied; and
selectively operate the plurality of working chambers of the engine at varying second operational firing fractions selected to meet the varying engine torque demands when the vehicle is not occupied,
wherein the autonomous vehicle operates in a more fuel efficient manner when not occupied compared to when occupied.

25. The autonomous vehicle of claim 24, wherein the number of firing fractions in the second set of firing fractions is larger than the number of firing fractions in the first set of firing fractions.

26. A method of operating an autonomous vehicle, the autonomous vehicle having an internal combustion engine providing motive power, the internal combustion engine having a working chamber, the working chamber having a torque output level, the method comprising:
determining whether an occupant is in the vehicle;
determining the torque output level of the working chamber to operate at either a first firing fraction or a second firing fraction based on the determination of the vehicle occupancy;
operating the working chamber of the internal combustion engine at the first firing fraction when occupied; and
operating the working chamber of the internal combustion engine at the second firing fraction when not occupied;
wherein the determined torque output level at the first firing fraction when the vehicle is occupied is different compared to the second firing fraction when the vehicle is not occupied.

27. The method of claim 26, wherein the internal combustion engine has a plurality of working chambers and one or more of the working chambers is/are capable of being deactivated so that torque output level(s) is zero.

28. The method of claim 26, wherein the engine operates with a different effective displacement when operating at either the first firing fraction or the second firing fraction depending on whether the occupant is in the vehicle.

29. The method of claim 26, wherein effective displacement of the internal combustion engine at the first firing fraction when the vehicle is occupied is larger than at the second firing fraction when the vehicle is not occupied.

30. The method of claim 26, wherein engine NVH is relatively smaller when the vehicle is occupied and operating at the first firing fraction compared to when the vehicle is not occupied and operating at the second firing fraction.

31. The method of claim 26, wherein the internal combustion engine has a plurality of working chambers and one or more of the working chambers is/are capable of being operated at a high torque output or a low torque output.

32. The method of claim 26, wherein the determined torque firing level is modulated on a firing opportunity by firing opportunity basis.

33. A vehicle capable of autonomous operation, comprising:
an engine having a plurality of working chambers;
an autonomous driving unit arranged to coordinate autonomous driving of the vehicle; and
a firing fraction controller for controlling skip fire operation of the engine to deliver a requested torque demand as defined by the autonomous driving unit, the firing fraction controller either:
operating the engine at a first effective firing fraction defining a first effective displacement of the engine when an occupant is present in the vehicle; or
operating the engine at a second effective firing fraction defining a second effective displacement of the engine when an occupant is not present in the vehicle,
wherein the engine:
(a) generates less Noise Vibration and harshness (NVH) at the first effective firing fraction compared to the second effective firing fraction; and
(b) is more fuel efficient when operating at the second effective firing fraction compared to second effective firing fraction.

34. The vehicle of claim 33, wherein the firing fraction controller is further configured to, when no occupant is present, to transition between multiple second effective firing fractions defining multiple second effective displacement levels of the engine during autonomous driving to meet changing requested torque demands without occupant NVH considerations.

35. The vehicle of claim 33, wherein the firing fraction controller is further configured to control a degree of reduction or elimination of mechanical slippage between the engine and a transmission of the vehicle at least partially depending on if an occupant is present in the vehicle or not.

36. The vehicle of claim 33, wherein the firing fraction controller, in cooperation with a transmission on the vehicle, coordinate more gear shifting during driving of the vehicle when the vehicle is not occupied relative to when the vehicle is occupied.

37. The vehicle of claim 33, further comprising:
a regenerative braking system arranged to store energy while the vehicle is braking; and
an electric motor/generator arranged to cooperate with the engine to deliver the requested torque demand, the electric motor/generator using the stored energy from the regenerative braking system;
wherein the firing fraction controller and the regenerative braking system cooperate to increase the amount of stored energy from regenerative braking when the vehicle is not occupied relative to when the vehicle is occupied.

38. The vehicle of claim 33 wherein the firing fraction controller is further arranged to operate the plurality of working chambers of the engine under dynamic firing level modulation control.

39. The vehicle of claim 33, wherein the firing fraction controller is further arranged to operate the working chambers of the engine such that some firing opportunities are skipped, some firing opportunities produce a low torque output, and some firing opportunities produce a high torque output.

40. The vehicle of claim 33, further comprising a look up table that is accessible by the firing fraction controller, the look up table defining a plurality firing fractions for a range of engine torque values that can be generated by the autonomous driving unit.

41. The vehicle of claim 33, wherein the firing fraction controller is further configured, during skip fire operation of the engine, to direct at least one working chamber to be selectively fired, skipped and either fired or skipped over successive firing opportunities.

* * * * *

UNITED STATES PATENT AND TRADEMARK OFFICE
CERTIFICATE OF CORRECTION

PATENT NO. : 10,518,764 B2
APPLICATION NO. : 15/874656
DATED : December 31, 2019
INVENTOR(S) : Cao et al.

Page 1 of 1

It is certified that error appears in the above-identified patent and that said Letters Patent is hereby corrected as shown below:

In the Specification

1. Column 1, Line 11, insert --.-- after --No--.

2. Column 8, Line 47, insert --.-- after --NVH--.

In the Claims

1. In Claim 33 (Column 18, Line 27) change "second" to --first--.

Signed and Sealed this
Twenty-fourth Day of March, 2020

Andrei Iancu
*Director of the United States Patent and Trademark Office*